United States Patent [19]

Ono et al.

[11] 4,448,895

[45] May 15, 1984

[54] PROCESS FOR PREPARATION OF CATALYST FOR CLEANING EXHAUST GASES AND CATALYST PREPARED BY THE PROCESS

[75] Inventors: Tetsuji Ono, Amagasaki; Kazuo Tsuchitani, Ibaraki; Shin Yamauchi, Ikeda; Kiyoshi Yonehara, Kawanishi, all of Japan

[73] Assignee: Nippon Shokubai Kagaku Kogyo Co. Ltd., Osaka, Japan

[21] Appl. No.: 439,191

[22] Filed: Nov. 4, 1982

[30] Foreign Application Priority Data

Nov. 11, 1981 [JP] Japan .................................. 56-179819

[51] Int. Cl.$^3$ ........................ B01J 21/04; B01J 23/10; B01J 23/89
[52] U.S. Cl. .................................. 502/304; 423/213.5
[58] Field of Search ..................... 252/462; 423/213.5; 502/304

[56] References Cited

U.S. PATENT DOCUMENTS

| | | | |
|---|---|---|---|
| 4,283,308 | 8/1981 | Ohara et al. | 252/462 X |
| 4,294,726 | 10/1981 | Bozon et al. | 252/462 |
| 4,299,734 | 11/1981 | Fujitani et al. | 252/462 |
| 4,378,307 | 3/1983 | Brunelle et al. | 252/462 X |

*Primary Examiner*—W. J. Shine
*Attorney, Agent, or Firm*—Sherman & Shalloway

[57] ABSTRACT

A process for preparing a catalyst for cleaning exhaust gases comprising a refractory carrier composed mainly of alumina and having deposited thereon, iron oxide, cerium oxide and at least one noble metal element, which comprises impregnating said carrier with (a) an aqueous solution A prepared by adding aqueous ammonia to an aqueous solution containing a water-soluble iron salt as a material for iron and a cerium salt of an organic acid as a material for cerium to adjust the pH of the aqueous solution to 6.0–9.0, and optionally adding an ammonium salt of an organic acid, and (b) an aqueous solution B containing a compound of the noble metal element.

11 Claims, 3 Drawing Figures

PROCESS FOR PREPARATION OF CATALYST FOR CLEANING EXHAUST GASES AND CATALYST PREPARED BY THE PROCESS

This invention relates to a three-way conversion catalyst for cleaning exhaust gases from internal combustion engine, and to a process for its preparation. More specifically, this invention relates to a "three-way catalyst" which simultaneously removes hydrocarbons (to be referred to as HC), carbon monoxide (to be referred to as CO) and nitrogen oxides (to be referred to as $NO_x$) from the exhaust gases in a single reaction layer and converts them into substantially non-toxic carbon dioxide gas, water and nitrogen, and to a process for its production.

Automobiles having such a three-way catalyst mounted thereon are presently equipped with a zirconia oxygen sensor set up in an exhaust pipe, an injection valve or a special carburetor capable of controlling the air-fuel ratio and a controlling computer as a system for feeding a gaseous mixture of air and gasoline always at the stroichiometric ratio to the engine. Such an engine is usually called a "closed-loop" engine. This type of engine generates an exhaust gas having perturbations of the air-fuel ratio about the stoichiometric point with a periodic variation, and the exhaust gas is fed into the three-way catalyst. It has been considered as extremely difficult to develop a three-way catalyst which can always exhibit cleaning performance above a certain level on exhaust gases having such a variable range, and none of the previously suggested three-way catalysts have proved to be entirely satisfactory. The exhaust gas to be fed has a variable composition; sometimes, it is an oxygen-rich oxidizing atmosphere and at other times it is a fuel-rich reducing atmosphere. A catalyst which can cope with these two atmospheres is considered to be still underdeveloped.

The present inventors previously proposed a three-way catalyst suitable for an engine of such a system, which contains iron oxide, cerium oxide, etc. as compounds having the ability to absorb oxygen on the catalyst when an exhaust gas temporarily becomes oxygen-excess and to release oxygen when it becomes oxygen-short, and which has dispersed and deposited catalytic substances including platinum, palladium, rhodium, and phosphorus having high three-way conversion activity, and a process for its production (U.S. Pat. No. 4,283,308).

It has been found that in the above three-way catalyst proposed by the present inventors, the distribution of the iron compound and the cerium compound deposited cannot be controlled to an optimal one, and these compounds are not fully utilized for retaining the activity of the three-way catalyst. Investigations of the present inventors have shown that iron oxide readily assumes different states of oxidation such as $Fe_2O_3$ and $Fe_3O_4$, and that if an insufficiency of oxygen required for oxidation of CO or HC should occur for a moment in a reaction gas when the iron oxide and a noble metal element such as platinum or palladium are sufficiently dispersed and mixed and are deposited finely on alumina closely to each other, the reaction of the gas can be carried out by oxygen released from the iron oxide. It has been made clear however that the in the aforesaid proposed three-way catalyst, iron oxide and the noble metal element are not deposited sufficiently finely and closely to each other, and the iron oxide tends to be deposited broadly also on parts remote from that part on which the noble metals are deposited, and therefore that iron oxide does not at all contribute to the activity of the three-way catalyst, and rather causes thermal troubles.

It has also been found that similarly, like iron, cerium also tends to be broadly deposited on those parts which are other than the part on which the noble metals are deposited, and thus cannot be sufficiently used for the three-way conversion activity of the catalyst. Thus, in a three-way catalyst for treating exhaust gases from an engine of the closed-loop system, it is most desirable that cerium oxide and iron oxide be mixed in a sufficiently fine state with the noble metal element and deposited on an alumina carrier while they are sufficiently close to the noble metal, and that no part of the carrier has only one of the two deposited thereon.

On the other hand, the inventors have known that in order to maintain catalytic activity and durability at high levels under actually used conditions, i.e. at high space velocities, the optimal depth of deposition of a platinum-group metal in the alumina carrier should be up to 300 microns from the surface of the carrier toward its inside in catalysts for the treatment of automobile exhaust gases.

It is an object of this invention therefore to provide a three-way catalyst for simultaneously converting carbon monoxide, hydrocarbons and nitrogen oxides in an exhaust gas from an internal combustion engine to substantially non-toxic gases, said catalyst consisting essentially of a refractory inorganic carrier composed mainly of active alumina, and as catalytically active substances, a noble metal element such as platinum (Pt), palladium (Pd), or rhodium (Rh) together with iron oxide and cerium oxide, said catalytically active substances being dispersed and deposited substantially in that part of the carrier which ranges from its surface to a depth of up to 300 microns, preferably up to 200 microns, toward its interior.

In order to deposit iron only on the surface portion of a granular carrier of alumina, U.S. Pat. No. 4,102,813 discloses a process for producing an alumina carrier having a surface portion with different properties such as pore diameter, which comprises putting a carrier impregnated with an aqueous solution of an alkali such as aqueous ammonia into an aqueous solution of ferric nitrate to form iron hydroxide on the surface of the carrier, drying the resulting carrier, calcining it at high temperatures to sinter that portion of alumina on which iron is deposited by the solid-phase reaction with iron and thus convert it to α-alumina. According to this method, however, the crystals of iron become too large, and since once iron has reacted with alumina, it cannot reversibly assume different atomic states such as $Fe_2O_3$ and $Fe_3O_4$, and consequently the resulting catalyst has only the reduced ability to absorb and store oxygen.

According to this invention, there is provided a three-way catalyst for cleaning exhaust gases from internal combustion engines, which is free from these defects and has both high activity and high durability.

An engine equipped with an automatic air-fuel ratio controlling mechanism (the closed-loop engine) exhibits the function of maintaining the air-fuel ratio at the stoichiometric point by an oxygen sensor set at its exhaust pipe. The characteristic of this system is that the air-fuel ratio is repeatedly on the rich and lean side of the stoichiometric point, and generally with a period of about 1 second, air-fuel perturbations of about ±1.0 A/F occur, and therefore that it is necessary to absorb and store excess oxygen on the catalyst on the lean side and to release it on the rich side for effective performance of the oxidation reaction. The catalyst of this invention is especially suitable for the cleaning of exhaust gases from such an engine.

Generally stated, the present invention has as its essence a process for preparing a catalyst for cleaning exhaust gases comprising a refractory carrier composed mainly of alumina and deposited thereon, iron oxide, cerium oxide and at least one noble metal element, which comprises impregnating said carrier with (a) an aqueous solution A prepared by adding aqueous ammonia to an aqueous solution containing a water-soluble iron salt as a material for iron and a cerium salt of an organic acid as a material for cerium to adjust the pH of the aqueous solution to 6.0-9.0, and optionally adding an ammonium salt of an organic acid and (b) an aqueous solution B containing a compound of the noble metal element.

The use of the aforesaid method suffices to achieve the purpose of depositing the noble metal together with iron and cerium up to a depth of about 300 microns, preferably about 200 microns, from the surface of the carrier as in the present invention.

Preferably, in the process of this invention, one of the aqueous solutions A and B is impregnated in the carrier in an amount 0.7 to 1.3 times the saturated amount of water absorption by the carrier, and then the other aqueous solution is impregnated in the carrier in an amount 0.7 to 1.3 times the saturated amount of water absorption by the carrier; or a mixture of the aqueous solutions A and B is impregnated in the carrier in an amount 0.7 to 1.3 times the saturated amount of water absorption by the carrier.

The catalyst obtained by the process of this invention has various advantages in addition to high activity and high durability. Since iron and cerium is deposited only in a very shallow limited locality from the surface of the carrier, i.e. to a depth of not more than about 300 microns, preferably not more than 200 microns, the amount of the materials for the active ingredients can be much smaller than in the prior art, and thus brings about an economical advantage. Furthermore, since iron and cerium are not deposited in the central portion of the carrier, the increase in the density of the catalyst can be minimized, and thereby the light off characteristics of the catalyst are not impaired. There is no risk of iron in the central portion reacting with alumina to reduce strength. In addition, when a compound containing a nitrate ion is not used as a raw material for iron, toxic gases $NO_x$ are scarcely generated during calcination. Accordingly, the process of this invention can be recommended as an industrial process for catalyst preparation.

According to one embodiment of the process of this invention, a cerium salt of an organic acid is first dissolved in a predetermined amount of deionized water, and then a water-soluble iron salt is added and dissolved completely. As required, an ammonium salt of an organic acid is added to the resulting uniform solution containing iron and cerium to stabilize the solution. Then, aqueous ammonia is added gradually to adjust the pH to an optimum value between 6.0 and 9.0 to obtain an impregnating liquid (aqueous solution A). Separately, an impregnating liquid (aqueous solution B) containing a compound of a noble metal such as Pt, Pd or Rh is prepared. The aqueous solution A is impregnated in a pre-measured refractory carrier, and the impregnated carrier is dried and calcined at 350° to 550° C. Then, the aqueous solution B is impregnated in the calcined product and dried. Thereafter, as required, the product is subjected to a reducing treatment in a hydrogen-containing nitrogen stream at 350° to 500° C., or calcined in the air at 400° to 700° C. Generally, an aqueous solution of a nitrate or chloride of a noble metal such as Pt, Pd or Rh, or a noble metal acid or its salt is used as the aqueous solution B.

According to a second embodiment of the process of this invention, an aqueous solution containing all catalyst ingredients prepared by dissolving at least one noble metal compound in the aforesaid uniform solution containing iron and cerium is impregnated in the carrier by one impregnating operation. The impregnated carrier is dried and then subjected to an activating treatment to form a finished catalyst. In this embodiment, chloroplatinic acid cannot be used as a material for platinum because this platinum compound cannot be maintained stably in solution when the pH of the solution is 6 to 9. Thus, for example, ammoniacal platinum has to be used as a raw material for platinum.

According to a third embodiment of the process of this invention, the step of impregnating the aqueous solution B containing at least one noble metal compound and the step of impregnating the aqueous solution A obtained by additionally dissolving at least one noble metal compound other than the one used in the aqueous solution B in the uniform solution containing iron and cerium are combined in any sequence. A drying step is provided after each of these impregnating steps, and if desired, a calcination step is also provided to obtain a finished catalyst.

According to a fourth embodiment of the process of this invention, the aqueous solution B containing at least one noble metal compound and the aqueous solution A prepared by additionally dissolving at least one noble metal compound other than the one used in the aqueous solution B in the aforesaid uniform solution containing iron and cerium are used. First, one of the aqueous solutions is impregnated in the carrier in an amount 0.15 to 0.85 times the saturated amount of water absorption by the carrier, and subsequently without drying, the other aqueous solutions is impregnated in the carrier in an amount 0.15 to 0.85 times the saturated amount of water absorption of by the carrier. The total amount of the two aqueous solution impregnated in adjusted to 0.7 to 1.3 times the saturated amount of water absorption by the carrier. The impregnated carrier is then dried, and as required, calcined to obtain a finished catalyst.

The third and fourth embodiments are very effective when the amount of rhodium is extremely small for the amount of platinum or a combination of platinum and palladium, for example when the ratio of Rh to Pt or to a combination of Pt and Pd is from 1:8 to 1:20. This is because in order to cause such a small amount of rhodium to function effectively in a three-way conversion reaction, it is important to deposit rhodium more concentratingly on the surface portion of the carrier than iron, cerium, Pt and Pd.

In particular, in the process of the fourth embodiment, it is preferred to deposit rhodium in the first place, and in order to deposit and distribute it uniformly on the carrier, it is desirable to spray the aqueous solution B in an amount 0.05 to 0.85 times, preferably 0.4 to 0.85 times, most preferably 0.6 to 0.85 times, the saturated amount of water absorption by the carrier onto the carrier which is fluidized in a rotating drum.

According to the fourth embodiment, to increase the power of rhodium to be adsorbed and bound to the carrier, it is effective to age the impregnated carrier by standing after the rhodium impregnating step. For example, when the aqueous solution A containing Fe, Ce, Pt and Pt is impregnated immediately after the carrier has been impregnated with the aqueous solution B containing rhodium chloride, rhodium adhering to the surface portion of the carrier in the impregnating step, because of its weak power of bonding to the carrier, is pushed into the inside of the carrier by the aqueous solution A in the next impregnating step, and the desired distribution of Rh cannot be obtained. However, if the next impregnating step is carried out after standing at room temperature for at least 5 minutes, preferably at least 10 minutes, upon the completion of the first impregnating step, rhodium is bound firmly to the surface portion of the carrier and prevented from being moved by the aqueous solution A. Heating the rhodium chloride solution to at least 50° C. prior to impregnation is another effective means of strengthening the bonding of rhodium to the carrier. If rhodium nitrate is used instead of rhodium chloride, the standing time required for aging can be greatly shortened.

Examples of the material for cerium used in this invention are cerous acetate, cerium oxalate and cerium citrate. In view of solubility, cerous acetate is most preferred.

Illustrative of the water-soluble iron salt which can be used in this invention are inorganic iron salts such as ferric nitrate and Mohr's salt and organic acid iron salts such as monobasic iron acetate, ammonium iron citrate, iron oxalate and iron formate. Of these, monobasic iron acetate and ammonium iron citrate are most preferred.

The impregnating mechanism during catalyst preparation in accordance with this invention has not been elucidated. The inventors of the present application, however, have discovered the following facts.

1. The ammonium salt of an organic acid to be added optionally to the aqueous solution A serves to alleviate abrupt changes in pH as a stabilizer (buffer) and to increase the stability of the solution after the pH adjustment.

2. When the amount of the organic acid ammonium salt is too large, Fe and Ce tend to be distributed undesirably to a larger depth.

3. When the pH of the aqueous solution A is not more than 6 or on the acidic side near 6, Fe and Ce tend to be distributed undesirably to a larger depth than when it is on the alkaline side.

4. The penetration of Fe and Ce can be controlled to the most desirable depth when the pH of the aqueous solution A is about 7 to 8. In addition, the noble metal is also deposited to a good depth in this case.

5. When the pH of the aqueous solution exceeds 9. The aqueous solution A containing Fe and Ce yields a precipitate, and cannot be impregnated in the carrier.

The amounts of Fe and Ce in the catalyst of this invention are preferably such that per liter of the finished catalyst, 0.5 to 30 g of Ce and 0.5 to 20 g of Fe, as atoms, are present. If the amounts of Fe and Ce are too small, the oxygen storing ability of the catalyst is insufficient, and the catalyst cannot maintain a sufficient activity in a three-way conversion reaction. If, on the other hand, the amounts of Fe and Ce are too large, they result in blocking up pores of the carrier and therefore in reduced catalytic activity.

The atomic ratio of Fe to Ce is preferably from 5:1 to 1:5, more preferably from 3:1 to 1:3. In view of stability at high temperatures, the especially suitable Fe:Ce atomic ratio is from 1.5:1 to 1:1.5.

The amount of Fe and Ce deposited in the surface layer or its vicinity of the catalyst can be quantitatively determined by shaking and abrading the catalyst in an organic solvent such as chloroform and analyzing the resulting powder by a fluorescent X-ray method. The preferred concentrations of Fe and Ce deposited are 0.3–5%, and 0.5–15%, respectively, when analyzed by this method.

The amount of the platinum-group metal used and the weight ratio of a plurality of platinum-group elements if used are determined by fully considering their prices and their proportions of occurrence in nature. In particular, when Rh is used, a Pt:Rh weight ratio of from 10:1 to 19:1 is suitably used. The total amount of the platinum-group metals is 0.1 to 3.0 g, preferably 0.3 to 2.0 g, per liter of the catalyst. In the process of this invention, the platinum-group metals are used in the form of water-soluble salts. Illustrative are chloroplatinic acid, ammoniacal platinum, dinitrodiaminoplatinum, palladium chloride, palladium nitrate, rhodium chloride, rhodium nitrate, and alkali salts of the metal acid.

In the process of this invention, a compound of Ni, Co, Mn, etc. can be used as a starting material as a compound of an optional ingredient together with iron and cerium compounds as compounds of the essential ingredients. Mixed rare earth element compounds containing a cerium compound may also be used as starting materials.

When the granular carrier is used in this invention, its shape is not limited to a specified one. For example, it may be spherical, cylindrical, fragmentary, or irregularly shaped. As a material for the carrier, γ-alumina, θ-alumina, δ-alumina, and pseudo-γ-alumina, which are called active alumina, can usually be employed. They may, as required, contain a heat-resistance improver such as barium, lanthanum, silica, neodymium and zirconia. Desirably, the carrier used in this invention has an apparent density of not more than 0.8 g/cc, preferably not more than 0.5 g/cc, a BET surface area of 25 to 300 m$^2$/g, preferably 50 to 200 m$^2$/g, an average pore diameter of 60 to 1000 Å, preferably 50 to 700 Å, and a total pore volume of at least 0.5 cc/g, and an average diameter of at least 2 mm. and possesses sufficient strength, abrasion resistance and heat shock resistance.

The following examples illustrate the present invention more specifically. It should be understood that these examples do not limit the present invention.

In the accompanying drawings.

EXAMPLE 1

Figure 1:
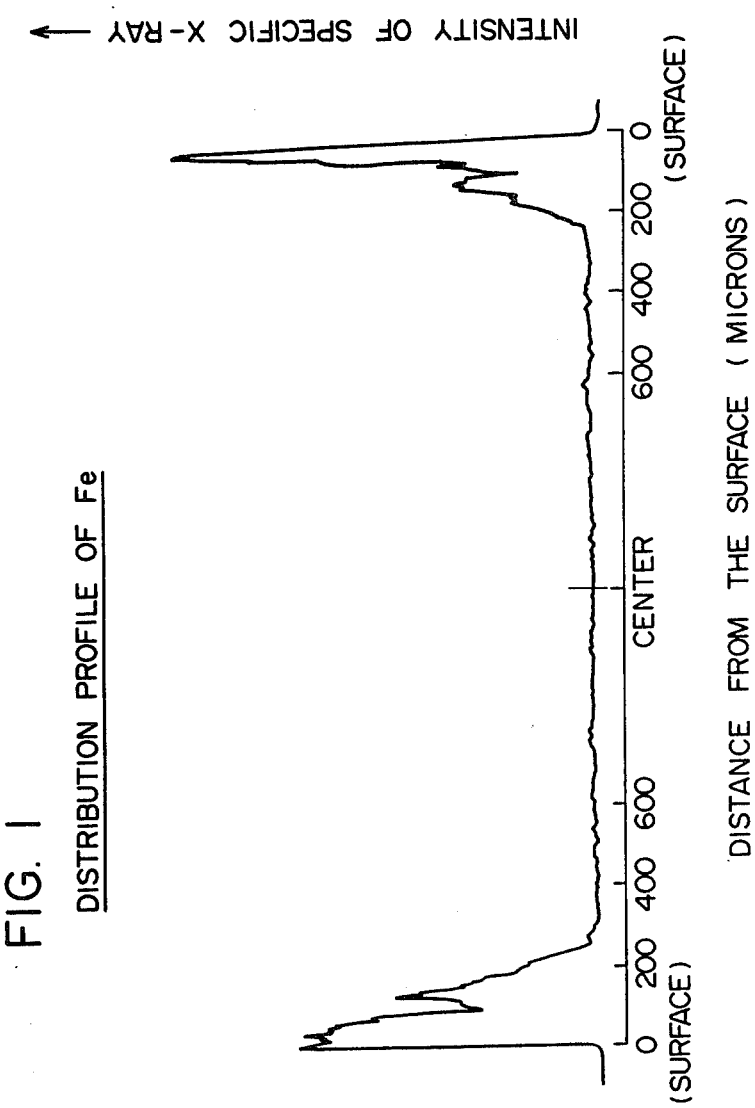
FIG. 1 is a graph showing the distribution of Fe element in the catalyst obtained in Example 1.

A catalyst was prepared in the following manner using one liter of a cylindrical alumina carrier having a diameter of 2.4 mm and an average length of 4 mm (a product of The Catalyst Co.; BET surface area 110 m$^2$/g, apparent density 0.5 g/cc, average pore size about 150 Å).

Cerous acetate monohydrate was dissolved in 400 cc of deionized water so that 10 g of cerium was included in the solution. Then, 5 g of ammonium acetate was added to the solution, and with stirring, ammonium iron citrate was added so that 4.0 g of iron was included in the solution. The iron salt completely dissolved at room temperature when 20% aqueous ammonia was added and the pH of the liquid was slowly raised to 7.0. Aqueous ammonia was further added to adjust the pH of the solution to 7.25 and the total amount of the solution was adjusted to 470 cc.

The aforesaid carrier was impregnated with the resulting aqueous solution, dried at 150° C. for 2 hours, and then calcined in the air at 500° C. for 3 hours. Subsequently, the calcined product was impregnated with 470 cc of an aqueous solution containing 0.54 g, as platinum metal, of chloroplatinic acid, 0.214 g, as palladium metal, of palladium nitrate and 0.032 g, as rhodium metal, of rhodium chloride, and then dried in the same way as above and calcined in the air at 500° C. for 2 hours.

The resulting catalyst is designated as catalyst A.

EXAMPLE 2

A catalyst was prepared by using the same carrier as in Example 1, but changing the material for iron.

Basic iron acetate was dissolved in 350 cc of deionized water under heat so that 4.0 g of iron was included. After coolng, cerous acetate was dissolved in the solution so that 10 g of cerium was included in the final solution. Then, 10 g of ammonium acetate was added, and with stirring, aqueous ammonia was slowly added and deionized water was also added to adjust the total amount of the solution to 470 cc and the pH to 8.5. The carrier was impregnated with the resulting aqueous solution, dried at 150° C. for 2 hours, and calcined in an air stream at 500° C. for 3 hours. Subsequently, the calcined product was impregnated with 470 cc of an aqueous solution containing 0.60 g, as platinum metal, of chloroplatinic acid and 0.05 g, as rhodium metal, of rhodium chloride, and treated in the same way as in Example 1 to give a finished catalyst.

This catalyst is designated as catalyst B.

EXAMPLE 3

A catalyst free from platinum was prepared in the same way as in Example 1.

The carrier was impregnated in the same way as in Example 1 with an aqueous solution containing iron and cerium, dried, and then calcined in an air stream at 500° C. for 3 hours. The calcined product was impregnated with 470 cc of an aqueous solution containing 0.80 g, as palladium metal, of palladium nitrate and 0.060 g, as rhodium metal, of rhodium chloride, dried, and then calcined in the air at 450° C. for 1 hour to give a finished catalyst.

This catalyst is designated as catalyst C.

COMPARATIVE EXAMPLE 1

A catalyst was prepared using ferric nitrate [Fe(NO$_3$)$_3$.9H$_2$O] and cerous nitrate [Ce(NO$_3$)$_3$.6H$_2$O] as starting materials.

One liter of the same carrier as used in Example 1 was impregnated with a solution of ferric nitrate containing 4 g of iron and cerous nitrate containing 10 g of cerium, dried, and then calcined at 500° C. for 3 hours. Then, the calcined product was impregnated with platinum, palladium and rhodium using the same amounts of the materials and the same technique as in Example 1, dried, and then calcined to give a finished catalyst.

This catalyst was designated as catalyst D.

COMPARATIVE EXAMPLE 2

A catalyst was prepared by using the same kinds of raw materials in the same amounts as in Example 2 except that ammonium acetate and aqueous ammonia were not added.

Basic iron acetate containing 4 g of iron was dissolved in 400 cc of deionized water while slowly heating it. Then, cerous acetate containing 10 g of cerium was dissolved. The total amount of the solution was adjusted to 470 cc. One liter of the same carrier as in Example 1 was impregnated with the resulting solution, dried, and calcined. Thereafter the calcined product was impregnated with platinum, palladium, and rhodium using the same technique and the same amounts of raw materials as in Example 1, dried and calcined to give a finished catalyst.

This catalyst is designated as catalyst E.

EXAMPLE 4

Each of the catalysts A, B and C obtained in Examples 1, 2 and 3 and each of the catalysts D and E obtained in Comparative Example 1 and 2 was filled in a stainless steel multitube reactor, and aged by a whole exhaust gas from a V-type 8-cylinder engine for 100 hours. The temperature of the gas at the inlet was 700° to 720° C., and the space velocity was 300,000 hr$^{-1}$. The air-fuel ratio was nearly the stoichiometric point. In order to accelerate degradation of the catalyst by poisoning, the gasoline was blended with a leaded gasoline and a lube oil additive so that it contained 0.005 g of lead per gallon and 0.015 g of phosphorus (P) per gallon.

The aged catalyst, while contained in the reactor, was connected to a small-sized four-cylinder engine (displacement 1,800 cc, electronic fuel injection type) and a test was conducted for evaluation of its performance in a three-way conversion reaction.

The reaction conditions were as follows: The temperature of the inlet gas was adjusted to 550° C., and the space velocity of the gas was adjusted to 80,000 hr$^{-1}$. In order for the gas at the inlet of the catalyst layer to simulate the characteristics of an exhaust gas of an actual closed-loop engine, a perturbated gas having an amplitude of ±1.0 A/F at 1 Hz controlled by an external oscillator signal was fed, and its average fuel air-fuel ratio was varied from 0.3 A/F on the rich side to 0.3 A/F on the lean side with the stoichiometric point as a center. The concentrations of the inlet gas and the outlet gas were analyzed, and the conversion efficiencies of the gases were calculated.

In a graph plotting the average air-fuel ratio against the conversion with regard to each of the catalysts, the conversion at the point of crossing between the curve of carbon monoxide (CO) conversion and the curve of nitrogen monoxide (NO) conversion was defined as a crossover point value, and the conversion of hydrocarbon (HC) at the corresponding air-fuel ratio was made a standard of evaluation.

The conversions of CO, HC and NO with respect to the average air-fuel ratio 0.1 A/F on the lean side in each of the catalysts were also made standards of evaluation.

The three-way conversion performances of the catalysts are summarized in Table 1.

TABLE 1

| Catalyst | CO—NO crossover point value | HC value of the crossover point | Conversion at +0.1 A/F | | |
|---|---|---|---|---|---|
| | | | CO | HC | NO |
| A | 75% | 93% | 83% | 95% | 57% |
| B | 72% | 91% | 79% | 93% | 55% |
| C | 76% | 91% | 83% | 93% | 53% |
| D | 64% | 88% | 70.5% | 90.5% | 51% |
| E | 66.5% | 89.5% | 73.5% | 91.5% | 54% |

EXAMPLE 5

Using the catalyst A obtained in Example 1 and catalyst D obtained in Comparative Example 1, variations in the distribution of the concentrations of iron and cerium in the direction of the interior of each catalyst were examined by an EPMA method (electron probe microanalysis).

Ten sample particles of each of the catalysts were selected, and embedded in a polyester resin. The cylindrical catalyst particles were each cut in a plane passing through the center to expose a round fractured surface. This surface was polished so that it became sufficiently smooth. Carbon was vapor-deposited on the polished surface, and analyzed by an electron probe microanalyzer (EPMA, model EMX-7 of Shimadzu Seisakusho Co., Ltd.).

Figure 2:
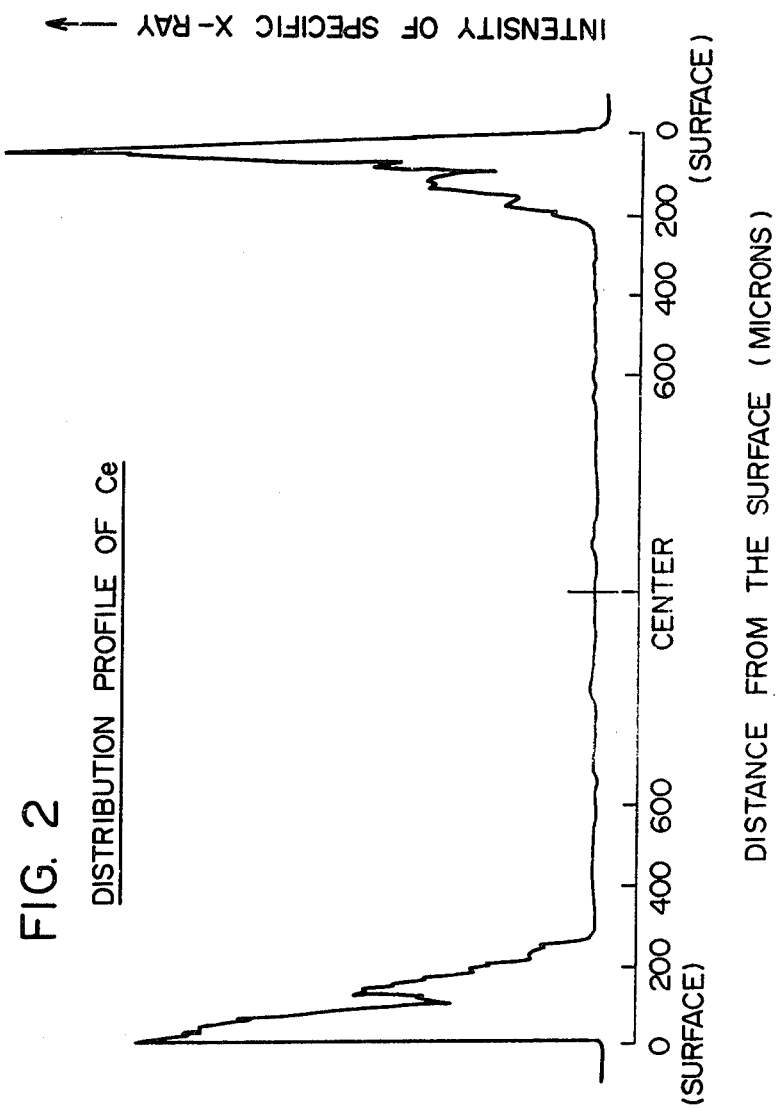
FIG. 2 is a graph showing the distribution of Ce element in the catalyst obtained in Example 1.
Figure 3:
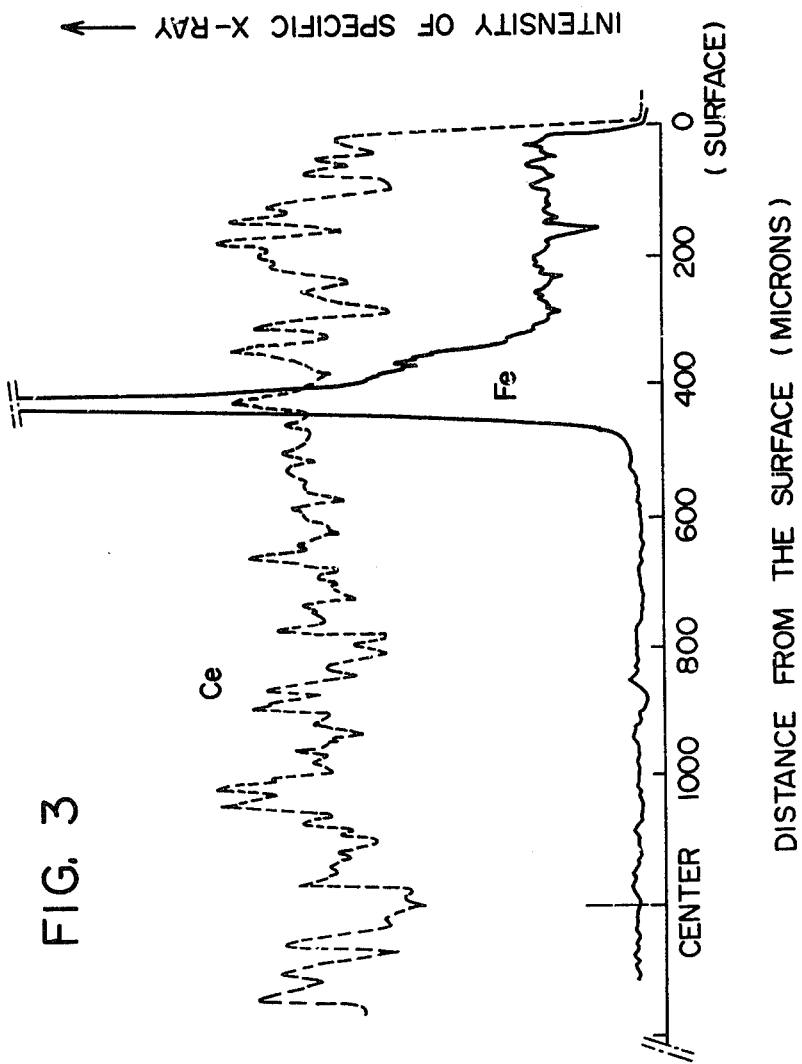
FIG. 3 is a graph showing the distribution of Fe element and Ce element in the catalyst obtained in Comparative Example 1.

Electron beams were caused to scan the sample over a straight line leading from the circumferential part of the fractured surface and passing through the center, thus allowing the continuous drawing of a graph showing the intensities of specific X-rays of iron and cerium. FIGS. 1, 2 and 3 of the accompanying drawings were obtained.

It is seen from FIGS. 1 and 2 that in the catalyst A of Example 1, Fe and Ce were present in the highest concentrations on the surface of the carrier, and monotonously decreased in concentration toward the inside of the carrier, and that substantially greater portions of Fe and Ce were deposited concentratingly in a region leading to a depth of about 200 microns from the surface.

FIG. 3 shows deposition profiles of iron and cerium in the direction of the inside of the catalyst D similar to those in FIGS. 1 and 2 (in this case, the sensitivity of the analyzer was increased for both Fe and Ce so that a portion having low concentrations of these could be detected). It is seen from FIG. 3 that cerium was distributed nearly uniformly from the surface to the center of the carrier, and that iron was present in a low concentration from the surface layer up to a depth of about 400 microns and had the highest concentration beyond that depth.

In the EPMA analyses of the catalyst B of Example 2 and catalyst E of Comparative Example 2, results of analysis very similar to the case of the catalysts A and D above were obtained.

EXAMPLE 6

Fifty grams of each of the catalyst A obtained in Example 1 and catalyst D obtained in Comparative Example 1 was put in a flat-bottomed flask, and 120 cc of chloroform was added. The mixture was shaken for about 30 minutes by a shaker.

The chloroform solution which became turbid by the abraded powder of the catalyst was separated from the catalyst, and chloroform was evaporated in an evaporation dish. The resulting powder was quantitatively analyzed by the fluoresence X-ray method.

Since the carrier used was in cylindrical form, the surface could not actually be abraded to a uniform thickness, and slightly greater shaving occurred at the corners. If it is assumed that the surface could be uniformly shaved, it follows that the catalyst was shaved in a thickness of 15 to 20 microns from the surface layer.

The results of analysis were:
Catalyst A: Fe 1.9% by weight Ce 5.5% by weight
Catalyst D: Fe 0.7% by weight Ce 2.1% by weight The above results agreed with the results obtained by EPMA, and thus it is seen that in the catalysts of this invention, F and Ce are effectively supported on the surface of the catalysts.

EXAMPLE 7

A catalyst was prepared in the same way as in Example 1 except that the carrier was changed.

One liter of spherical active alumina carrier having a diameter of 2 to 4 mm (a product of Rhone-Poulenc Company; BET surface area 130 m$^2$/g; apparent density 0.46 g/cc) was impregnated with 430 cc of an impregnating aqueous solution A prepared from the same materials and by the same technique as in Example 1, dried and calcined in the same way as in Example 1. Then, the calcined product was impregnated with 430 cc of an impregnating aqueous solution B containing the same amounts of platinum, palladium and rhodium as in Example 1 dissolved therein, and then dried and calcined in the same way as in Example 1 to give a finished catalyst.

EPMA showed that this catalyst had a similar deposition profile to the catalyst in Example 1, and most of Fe and Ce were deposited in a region leading to a depth of about 230 microns, and that the durability of this catalyst in an engine was as good as the catalyst obtained in Example 1.

EXAMPLE 8

One liter of the same carrier as in Example 1 was used, and a catalyst having the same composition as in Example 1 was prepared by a method different from the method used in Example 1.

Prior to the preparation of the impregnating solution, chloroplatinic acid, $H_2PtCl_6$, was converted to the form of an ammoniacal platinum complex solution as follows: A 500 cc three-necked flask equipped with an agitater and a water cooler was charged with 100 cc of a chloroplatinic acid solution containing 10 g of Pt, and 55 cc of 9.7 N ammonia solution was added slowly to the flask to form an orange-colored precipitate of ammonium chloroplatinate. The flask was gently heated to 70° C. over the course of 30 minutes with continuous stirring, and then kept at this temperature for an additional 60 minutes to dissolve the precipitate completely. The cooled solution showed a light yellow color and had a pH of about 9.5. Finally, the concentration of platinum in the solution was adjusted to 40 g per liter of the solution.

Ten grams, as cerium, of cerous acetate was dissolved in 350 cc of deionized water, and then 5 g of ammonium acetate was added. Further, ammonium iron citrate containing 4 g of iron was added. With stirring, aqueous ammonia was added to increase the pH of the solution to 6.8. Subsequently, an aqueous solution of ammoniacal platinum in an amount of 0.54 g as platinum, an aqueous solution of palladium nitrate containing 0.214 g of palladium, and an aqueous solution of rhodium chloride containing 0.032 g of rhodium were added. After the lapse of about 15 minutes, it was confirmed that no precipitate was formed in the solution. Then, a small amount of aqueous ammonia was added to increase the pH of the solution to 7.30, and the total amount of the solution was adjusted to 470 cc. The carrier was impregnated with the resulting aqueous solution, and dried at 150° C. for 2 hours and then calcined in the air at 500° C. in the same way as in Example 1 to give a finished catalyst.

This catalyst was analyzed by EPMA, and it was found that Ce, Fe, Pt, Pd and Rh were almost entirely deposited in a region leading to a depth of about 200 microns from the surface in a pattern very similar to that in Example 1.

EXAMPLE 9

One liter of the same carrier as used in Example 7 was used, and a catalyst having the same composition and containing the same amounts of the ingredients deposited as in Example 1 was prepared by the following method.

The carrier was impregnated with 430 cc of an aqueous solution containing rhodium chloride in an amount of 0.05 g as rhodium metal, and then dried at 150° C. for 2 hours.

Cerous acetate monohydrate in an amount of 10 g as cerium was dissolved in 310 cc of deionized water, and then 5 g of ammonium acetate was added. Subsequently, ammonium iron citrate in an amount of 4 g as iron was put in the solution, and with stirring, aqueous ammonia was added to increase the pH of the solution to 6.8. An aqueous solution (13.5 cc) of ammoniacal platinum in an amount of 0.54 g as platinum and 2.1 cc of an aqueous solution of palladium nitrate in an amount of 0.21 g as palladium were additionally dissolved in the solution, and a small amount of aqueous ammonia was added to increase the pH to 7.3. Water was added to adjust the total amount of the solution to 430 cc.

The aqueous solution was impregnated in the aforesaid carrier in which rhodium had already been deposited. The impregnated carrier was dried at 150° C. for 2 hours, and calcined in the air at 500° C. for 3 hours to give a finished catalyst.

EPMA showed that in this catalyst, Ce, Fe, Pt and Pd were deposited in a region leading to a depth of about 200 microns from the surface in a pattern very similar to that in Example 1, and that most of rhodium was deposited in a region leading to a depth of about 40 to 45 microns from the surface.

EXAMPLE 10

A catalyst was prepared in accordance with the same recipe as in Example 9 except that the sequence of the deposition of rhodium and the deposition of Fe, Ce, Pt and Pd was changed.

Specifically, Fe, Ce, Pt and Pd were first impregnated in the carrier. The carrier was dried, and calcined, and then rhodium was impregnated, followed by drying to give a finished catalyst.

EPMA showed that this catalyst had a very similar pattern of deposition to that in Example 9, but rhodium was deposited somewhat deeper than in Example 9, to a depth of 55 to 60 microns from the surface.

EXAMPLE 11

Eight liters of the same carrier as used in Example 7 was put in a rotating drum having an inside diameter of 55 cm and having applied to its inside a plastic lining. A solution of 0.256 g as rhodium, of rhodium chloride in 2.60 liters of deionized water was put in a pressure vessel, and sprayed onto the carrier in the rotating drum through a spray nozzle under a nitrogen pressure of 0.5 kg/cm$^2$. The rotating speed of the drum and the size of the spray nozzle were carefully adjusted so that the rhodium solution could be uniformly dispensed and impregnated to and in the carrier particles. The amount of the rhodium solution corresponded to 75% of the total amount of water which the carrier could absorb. The carrier having the rhodium solution impregnated therein was left to stand at room temperature for 30 minutes for aging.

Separately, 80 g, as cerium, of cerous acetate monohydrate and 32 g, as iron, of ammonium iron citrate were added to 0.5 liter of deionized water, and 40 g of ammonium acetate were added. They were fully stirred to form a solution. To the solution was added dropwise concentrated aqueous ammonia to increase the pH of the aqueous solution to 7.0. To the resulting aqueous solution were successively added 108 cc of an aqueous solution of ammoniacal platinum in an amount of 4.32 g as platinum and 17 cc of an aqueous solution of palladium nitrate in an amount of 1.71 g as palladium, followed by mixing. Water was added to the solution, and the total amount of the solution was adjusted to 0.87 liter. The resulting aqueous solution (pH 6.9) was sprinkled onto the aged carrier containing rhodium impregnated therein, and hot air was applied to it until its surface dried. The amount of the aqueous solution containing Fe, Ce, Pt, and Pd corresponded to 25% of the total amount of water which the carrier could absorb.

The impregnated carrier was then dried at 150° C. for 2 hours, and calcined in the air at 500° C. for 2 hours to give a finished catalyst.

EPMA showed that this catalyst had a very similar pattern of deposition to the catalyst obtained in Example 1, and that most of Ce, Fe, Pt and Pd were deposited in a region leading to a depth of 200 microns from the surface, and most of Rh was deposited in a region leading to a depth of 50 microns from the surface.

EXAMPLE 12

A catalyst was prepared in the same way as in Example 11 except that rhodium nitrate was used instead of rhodium chloride, and the standing time at room temperature of the carrier after rhodium deposition was shortened to 5 minutes. EPMA showed that in the resulting catalyst, the depths of deposition of the active ingredients were much the same as in the catalyst prepared in Example 11.

What is claimed is:

1. A process for preparing a catalyst for cleaning exhaust gases comprising a refractory carrier composed mainly of alumina and having deposited thereon, iron oxide, cerium oxide and at least one platinum group noble metal element, which comprises impregnating said carrier with
    (a) an aqueous solution A prepared by adding aqueous ammonia to an aqueous solution containing a water-soluble iron salt as a material for iron and a cerium salt of an organic acid as a material for cerium to adjust the pH of the aqueous solution to 6.0–9.0, and optionally adding an ammonium salt of an organic acid, and
    (b) an aqueous solution B containing a compound of the platinum group noble metal element; drying and calcining said impregnated carrier, the catalyst containing 0.5 to 20 g of iron and 0.5 to 20 g of cerium per liter of the catalyst.

2. The process of claim 1 wherein an iron salt of an organic salt is used as the material for iron.

3. The process of claim 2 wherein the iron salt of an organic acid is basic iron acetate or ammonium iron citrate.

4. The process of claim 1 wherein cerous acetate is used as the material for cerium.

5. The process of any one of claims 1 to 4 wherein one of the aqueous solutions A and B was impregnated in an amount 0.7 to 1.3 times the saturated amount of water absorbable by the carrier, water is fully removed from the carrier, and then the other aqueous solution is impregnated in the carrier in an amount 0.7 to 1.3 times the saturated amount of water absorbable by the carrier.

6. The process of any one of claims 1 to 4 wherein a mixture of the aqueous solutions A and B is impregnated in the carrier in an amount 0.7 to 1.3 times the saturated amount of water absorbable by the carrier.

7. The process of claim 5 wherein the aqueous solution B containing a compound of at least one platinum group noble metal and the aqueous solution A which further contains a compound of at least one platinum group noble metal other than the one in the aqueous solution B are used.

8. The process of any one of claims 1 to 4 wherein the aqueous solution B containing a compound of at least one platinum group noble metal and the aqueous solution A which further contains a compound of at least one platinum group noble metal other than the one used in the aqueous solution B are used, and first one of the aqueous solutions is impregnated in the carrier in an amount 0.15 to 0.85 times the saturated amount of water absorbable by the carrier, and subsequently without drying, the other aqueous solution is impregnated in the carrier in an amount 0.15 to 0.85 times the saturated amount of water absorbable by the carrier, the total amount of the two aqueous solutions impregnated being 0.7 to 1.3 times the saturated amount of water absorbable by the carrier.

9. The process of any one of claims 1 to 8 wherein the platinum group noble metal compound is a compound of platinum, palladium or rhodium.

10. The process of claim 7 or 8 wherein the aqueous solution B containing a compound of rhodium and the aqueous solution A which further contains a compound of platinum and/or palladium are used.

11. A catalyst for cleaning exhaust gases prepared by the process of any one of claims 1 to 10, said catalyst comprising an alumina carrier having an apparent density of not more than 0.8 g/cc, a BET surface area of 25 to 300 m$^2$/g, an average pore diameter of 60 to 1000 Å, a total pore volume of at least 0.5 cc/g and an average diameter of at least 2 mm, and substantial portions of catalyst ingredients deposited in that region of the alumina carrier which leads to a depth of about 300 microns toward the inside the carrier from its surface.

* * * * *

UNITED STATES PATENT AND TRADEMARK OFFICE
CERTIFICATE OF CORRECTION

PATENT NO. : 4,448,895
DATED : May 15, 1984
INVENTOR(S) : TETSUJI ONO, ET AL.

It is certified that error appears in the above—identified patent and that said Letters Patent is hereby corrected as shown below:

Claim 1, Column 13, line 2, correct line to read:

--- containing 0.5 to 20 g of iron and 0.5 to 30 g of ---

Signed and Sealed this

Eighteenth Day of September 1984

[SEAL]

*Attest:*

GERALD J. MOSSINGHOFF

*Attesting Officer*

*Commissioner of Patents and Trademarks*